(12) United States Patent
Good et al.

(10) Patent No.: US 8,370,761 B2
(45) Date of Patent: Feb. 5, 2013

(54) METHODS AND SYSTEMS FOR INTERACTIVE CLASSIFICATION OF OBJECTS (75) Inventors: Lance E. Good, Cupertino, CA (US); Mark J. Stefik, Portola Valley, CA (US); Alexander B. Brawer, Berne (CH)

(73) Assignee: Xerox Corporation, Norwalk, CT (US)

( * ) Notice: Subject to any disclaimer, the term of this patent is extended or adjusted under 35 U.S.C. 154(b) by 2522 days.

(21) Appl. No.: 10/369,624

(22) Filed: Feb. 21, 2003

(65) Prior Publication Data

US 2003/0179236 A1    Sep. 25, 2003

Related U.S. Application Data

(60) Provisional application No. 60/357,850, filed on Feb. 21, 2002.

(51) Int. Cl.
*G06F 3/048* (2006.01)
(52) U.S. Cl. ......... 715/767; 715/275; 715/788; 345/619
(58) Field of Classification Search .................... 715/767
See application file for complete search history.

(56) References Cited

U.S. PATENT DOCUMENTS

| | | | |
|---|---|---|---|
| 5,077,668 A | 12/1991 | Doi | |
| 5,257,186 A | 10/1993 | Ukita et al. | |
| 5,278,980 A | 1/1994 | Pedersen et al. | |
| 5,339,391 A | 8/1994 | Wroblewski et al. | |
| 5,384,703 A | 1/1995 | Withgott et al. | |
| 5,479,600 A | 12/1995 | Wroblewski et al. | |
| 5,689,716 A | 11/1997 | Chen | |
| 5,708,806 A * | 1/1998 | DeRose et al. | 707/104.1 |
| 5,745,602 A | 4/1998 | Chen et al. | |
| 5,778,397 A | 7/1998 | Kupiec et al. | |
| 5,838,317 A * | 11/1998 | Bolnick et al. | 715/764 |
| 5,838,323 A | 11/1998 | Rose et al. | |
| 5,867,164 A | 2/1999 | Bornstein et al. | |
| 5,867,799 A * | 2/1999 | Lang et al. | 707/1 |
| 5,918,240 A | 6/1999 | Kupiec et al. | |
| 5,920,313 A * | 7/1999 | Diedrichsen et al. | 715/767 |
| 5,924,108 A | 7/1999 | Fein et al. | |
| 5,978,820 A | 11/1999 | Mase et al. | |
| 5,995,978 A * | 11/1999 | Cullen et al. | 707/104.1 |
| 6,070,176 A * | 5/2000 | Downs et al. | 715/513 |
| 6,128,634 A * | 10/2000 | Golovchinsky et al. | 715/235 |
| 6,160,553 A * | 12/2000 | Robertson et al. | 715/767 |
| 6,185,592 B1 | 2/2001 | Boguraev et al. | |
| 6,243,093 B1 * | 6/2001 | Czerwinski et al. | 715/848 |
| 6,289,304 B1 | 9/2001 | Grefenstette | |

(Continued)

OTHER PUBLICATIONS

Woodruff et al, "Using Thumbnails to Search the Web", Mar. 2001, ACM Press, Conference on Human Factors in Computing Systems—Proceedings of the SIGCHI conference on Human factors in computing systems, pp. 198-205.*

(Continued)

*Primary Examiner* — Alvin Tan
(74) *Attorney, Agent, or Firm* — Oliff & Berridge, PLC (57) ABSTRACT

Methods and systems provide a computational assistance for interactive classification that compensates for the small size of computer screens and accelerates classification tasks. Similarity indicators reduce manual search by enabling information objects to "call out" automatically to encourage a sensemaker to place related items nearby. Similarity terms signal which groups or objects match and why they match. Using these techniques, an interactive classification tool can focus a sensemaker's attention, move things into view automatically, and provide shortcuts for automatic classification. These techniques speed up classification for rule-based classification, example-based classification, and mixed strategies and have the potential for application in a wide variety of sensemaking tools.

23 Claims, 7 Drawing Sheets

U.S. PATENT DOCUMENTS

| | | | | |
|---|---|---|---|---|
| 6,289,361 | B1* | 9/2001 | Uchida | 715/501.1 |
| 6,308,175 | B1* | 10/2001 | Lang et al. | 707/10 |
| 6,583,794 | B1* | 6/2003 | Wattenberg | 715/708 |
| 6,629,097 | B1* | 9/2003 | Keith | 707/5 |
| 6,804,662 | B1* | 10/2004 | Annau et al. | 707/2 |
| 6,968,332 | B1* | 11/2005 | Milic-Frayling et al. | 707/3 |
| 7,051,277 | B2* | 5/2006 | Kephart et al. | 715/530 |
| 7,278,115 | B1* | 10/2007 | Conway et al. | 715/838 |
| 2002/0010718 | A1* | 1/2002 | Miller | 707/526 |
| 2002/0055919 | A1* | 5/2002 | Mikheev | 707/3 |
| 2002/0138529 | A1* | 9/2002 | Yang-Stephens et al. | 707/530 |
| 2004/0002973 | A1* | 1/2004 | Chaudhuri et al. | 707/7 |
| 2005/0010583 | A1* | 1/2005 | Clifton-Bligh | 707/100 |
| 2008/0092072 | A1* | 4/2008 | Ishida et al. | 715/764 |

OTHER PUBLICATIONS

E. Ayers et al., "Using Graphic History in Browsing the World Wide Web", The 4th International World Wide Web Conference, www.w3.org/Conferences/WWW4/Program_Full.html, Dec. 11-14, 1996.

B. Bederson et al., Jazz: An Extensible Zoomable User Interface Graphics Toolkit in Java., *Proceedings of UIST 2000*, pp. 171-180, (2000).

T. Berlage, "A Selective Undo Mechanism for Graphical user Interfaces Based on Command Objects", *ACM Transactions on Computer-Human Interaction*, vol. 1, No. 3, pp. 269-294, 1994.

R. Gandhi et al., "Domain Name Based Visualization of Web Histories in a Zoomable User Interface", In Proceedings of 11th International Workshop on Database and Expert Systems Applications—Second International Workshop on Web-Based Information Visualization (WebVis 2000), *IEEE Computer Society*, pp. 591-598, 2000.

R. Hightower et al., "PadPrints: Graphical Multiscale Web Histories", *Proceedings of UIST*, pp. 121-122, 1998.

W. Hill et al., "Edit Wear and Read Wear", *Proceedings of CHI '92*, pp. 3-9.

D. Kurlander et al., "Editable Graphical Histories", *IEEE 1988 Workshop on Visual Languages*, pp. 416-423, 1988.

B. Myers et al., "A Multi-View Intelligent Editor for Digital Video Libraries", *Intelligent Editor for Digital Video Libraries*, submitted for publication, pp. 1-10, 2001.

C. Ahlberg et al., "The Alphaslider: A Compact and Rapid Selector", *Proceedings of CHI*, pp. 365-371, 1994.

Y. Ayatsuka et al., "Popup Vernier: a Tool for Sub-pixel-pitch Dragging with Smooth Mode Transition", *Proceedings of UIST*, pp. 39-48, 1998.

T. Ball et al., "Software Visualization in the Large", *IEEE Computer*, vol. 29, No. 4, pp. 33-43, 1996.

B. Bederson et al., "Pad++: A Zoomable Graphical Sketchpad for Exploring Alternate Interface Physics", *Journal of Visual Languages and Computing*, vol. 7, pp. 3-31, 1996.

D. Byrd, "A Scrollbar-based Visualization for Document Navigation", *Proceedings of the fourth ACM conference on Digital Libraries*, pp. 122-129, 1999.

D. Cox et al., "The Usability of Transparent Overview Layers", *Proceedings of CHI*, pp. 301-302, 1998.

A. Dieberger et al., "A City Metaphor to Support Navigation in Complex Information Spaces", *Journal of Visual Languages and Computing*, vol. 9, pp. 597-622, 1998.

G. Furnas, "Generalized Fisheye Views", *Proceedings of CHI*, pp. 16-23, 1986.

C. Manning et al., "Dirty Hands", *Foundations of Statistical Natural Language Processing*, MIT Press, pp. 31-34, 1999.

M. Hearst, "TileBars: Visualization of Term Distribution Information in Full Text Information Access." *Proceedings of CHI '95*, pp. 59-66, 1995.

T. Masui, "LensBar—Visualization for Browsing and Filtering Large Lists of Data", *Proceedings of Info Vis*, 1998.

S. McCrickard et al., "Beyond the Scrollbar: An Evolution and Evaluation of Alternative Navigation Techniques", *Proceedings of the IEEE Symposium on Visual Languages*, pp. 270-277, 1999.

S. Pook et al., "Context and Interaction in Zoomable User Interfaces", *Proceedings of the ACM Conference on Advanced Visual Interfaces*, pp. 227-231 & 317, 2000.

F. Shipman et al., "Beyond Location: Hypertext Workspaces and Non-Linear Views", *Proceedings of the Tenth ACM Conference on Hypertext and Hypermedia*, pp. 121-130, 1999.

B. Shneiderman, "Designing the User Interface: Strategies for Effective Human Computer Interaction" *Addison-Wesley*, pp. 451-452, 1998.

R. Spence et al., "Data Base Navigation: An Office Environment for the Professional", *Behavior and Information Technology*, pp. 43-54, 1982.

G. Robertson et al., "The Document Lens", *Proceedings of UIST93*, pp. 101-108, 1993.

B. Bederson et al., "Implementing a Zooming User Interface: Experience Buidling Pad++", *Software: Practice and Experience*, vol. 28, No. 10, pp. 1101-1135, 1998.

S. Card et al., "Degree-of-Interest Trees: A Component of an Attention-Responsive User Interface", submitted to CHI, 2002.

D. Nation et al., "Browse Hierarchical Data with the Degree of Interest Tree", submitted to CHI, 2002.

K. Perlin et al., "Pad: An Alternative Approach to the Computer Interface", *Proceedings of 1993 ACM SIGGRAPH Conference*, pp. 57-64, 1993.

O. Buyukkokten et al., "Accordion Summarization for End-Game Browsing on PDAs and Cellular Phones", *CHI 2001*, pp. 213-220, 2001.

M. Czerwinski et al., "Visualizing Implicit Queries for Information Management and Retrieval", *Proceedings of CHI'99*, pp. 560-567, 1999.

D. Hederson, Jr. et al., "Rooms: The Use of Multiple Virtual Workspaces to Reduce Space Contention in a Window-Based Graphical User Interface", *ACM Transactions on Grpahics*, vol. 5, No. 3 pp. 211-243, 1986.

D. Jerding et al., "The Information Mural: A Technique for Displaying and Navigating Large Information Spaces", *IEEE Transactions on Visualization and Computer Graphics*, vol. 4, No. 3, pp. 257-271, 1998.

T. Malone, How Do People Organize Their Desks? Implications for the Design of Office Information Systems, *ACM Transactions on Office Information Systems*, vol. 1, No. 1, pp. 99-112, 1983.

M. Stefik et al., Beyond the Chalkboard: Computer Support for Collaboration and Problem Solving in Meetings, *Communications of the ACM*, vol. 30, No. 1, pp. 32-47, 1987.

A. Woodruff et al., "Using Thumbnails to Search the Web", *Conference Proceedings of CHI 2001*, vol. 3, Issue 1, pp. 198-205, 552, 2001.

W. Estes, Classification and Cognition, New York Oxford University Press, pp. 32-87, 1994.

K. Knight et al., "Statistics-Based Summarization—Step One: Sentence Compression", *American Association for Artificial Intelligence*, 2000.

M. Mills et al., "A Magnifier Tool for Video Data", *CHI '92*, pp. 93-98, 1992.

Co-pending U.S. Appl. No. 10/369,614 to Benjamin Bederson et al.., filed Feb. 21, 2003, entitled Method and System for Incrementally Changing Text Representation.

Co-pending U.S. Appl. No. 10/369,612 to Lance E. Good et al.., filed Feb. 21, 2003, entitled Methods and Systems for Navigating a Workspace.

Co-pending U.S. Appl. No. 10/369,613 to Benjamin Bederson et al., filed Feb. 21, 2003, entitled Methods and Systems for Incrementally Changing Text Representation.

Co-pending U.S. Appl. No. 10/369,617 to Lance E. Good et al.., filed Feb. 21, 2003, entitled Methods and Systems for Indicating Invisible Contents of Workspace.

* cited by examiner

METHODS AND SYSTEMS FOR INTERACTIVE CLASSIFICATION OF OBJECTS

This non-provisional application claims the benefit of U.S. Provisional Application No. 60/357,850, entitled "Zooming Interfaces For Sensemaking, Visualization, and Navigation" which was filed on Feb. 21, 2002, and is hereby incorporated by reference in its entirety.

RELATED APPLICATIONS

The following related U.S. patent applications are hereby incorporated herein by reference in their entirety:

U.S. patent application Ser. No. 10/371,017 "System and Method for Interaction of Graphical Objects on a Computer Controlled System";

U.S. Pat. No. 7,068,288 entitled "System and Method for Moving Graphical Objects on a Computer Controlled System";

U.S. patent application Ser. No. 10/369,613 entitled "Method and System for Incrementally Changing Text Representation";

U.S. patent application Ser. No. 10/369,614 entitled "Method and System for Incrementally Changing Text Representation";

U.S. patent application Ser. No. 10/369,612 entitled "Methods and Systems for Navigating a Workspace"; and U.S. patent application Ser. No. 10/369,617 entitled "Methods and Systems for Indicating Invisible Contents of Workspace".

BACKGROUND OF THE INVENTION

1. Field of Invention

This invention relates to methods and systems for interactive classification of object.

2. Description of Related Art

"Sensemaking" is a process of gathering, understanding, and using information for a purpose. Sensemaking tasks often involve searching for relevant documents and then extracting and reformulating information so that the information can be better utilized. A sensemaker gathers information, identifies and extracts portions of the information, organizes such portions for efficient use, and ultimately incorporates the information in a work product with the required logical and rhetorical structure.

A common part of many sensemaking tasks is organizing "factoids" or other units of information, or objects, into related groups. Objects may be any form, such as simple text or a list of items. The difficulty of organizing objects depends on several practical factors, including the number of objects to be organized and the efficiency of the operations for finding, reading and manipulating the objects.

A key factor that influences the efficiency of an organizing task on a display, such as a computer display, is the size of a viewed space in a workspace. For a classification task on a display too small to show all of the objects, some objects are necessarily out of sight, so that a sensemaker must take additional steps and often use more time in locating and manipulating objects. In this case, search operations generally require not only scanning with the eyes, but also navigation with a pointer using panning, scrolling, and zooming. Such operations, which bring objects into the viewed space, significantly add to the time required in comparison with larger displays. The overhead of panning or scrolling can also adversely affect overall performance by distracting the sensemaker with extra steps and by requiring the sensemaker to remember things while navigating between objects.

Estes teaches that there are two primary types of models used to explain human classification behavior: exemplar-based models and rule-based models (Estes, W. K. (1994) Classification and Cognition. New York: Oxford University Press, pp 33-87). These two models of classification also correspond well with how humans organize objects into groups using a workspace such as a computer display.

In organizing objects into groups in a workspace, the rule-based classification tends to be formal. In this instance, a set of categories is determined, and explicit membership criteria are established for each of the categories by rules. To classify an object, a sensemaker checks the rules for each category and adds an object to whichever category the object satisfies the rules. Classifying an object amounts to adding the object to a "bucket" containing the objects that satisfy the membership criteria.

Determining or defining a category requires upfront work. A sensemaker may have to assign or allocate a place for the new category, determine the membership criteria, add the object to the category, and write down the membership criteria in a title or other visible label. Once this is done, however, future assignments of objects to this category go faster because the sensemaker need only check the label and then "drop" appropriate objects into the category.

With respect to computer systems, the membership criteria often take the form of a title or label on a window or folder. For example, e-mail systems, such as Eudora® and Microsoft® Outlook®, provide hierarchies of named mail folders for classifying messages. Storing an email message into an appropriate folder is an example of classifying an object. A key feature of interactive rule-based classification is that the decision about how to classify an object requires reading the membership criteria (in the form of titles or folder names), but generally does not require reading the previously classified objects (such as the email messages already in the folder).

Organizing objects into groups in a workspace using exemplar-based classification, on the other hand, is more tentative and informal. To classify an object, one must compare the object with the examples in an informal category or cluster in order to determine whether the object fits. Classifying an object amounts to placing the object in or near a cluster of similar objects.

Creating a cluster or implicit category requires less upfront work than creating a formal, or explicit category, but has greater overhead for future classifications. To set up a new cluster, a sensemaker simply places a new object in some uncrowded region of the workspace, possibly near other clusters or categories that seem somewhat related. No label or membership criteria are supplied. Future classifications are somewhat more tedious than in the case of explicit categories because the sensemaker needs to examine members of clusters in order to determine where to place new objects. Unless the sensemaker remembers tentative abstractions for a cluster, there is no shortcut for membership determination by checking a label or rule.

In a workspace, exemplar-based classification amounts to visual clustering. There are no explicit titles or rules for membership in a cluster. The boundaries of the clusters can be somewhat more tentative and ambiguous, especially when two clusters are near each other. The decision about how to classify an object requires reading or scanning other objects to detect similarity, and then locating the new object near the other objects that the new object best matches.

In interactive sensemaking workspaces, two types of overviews may be available: structural overviews that show a list of categories to which objects may be classified, and special overviews that show positional relationships of objects in the workspace.

Figure 1:
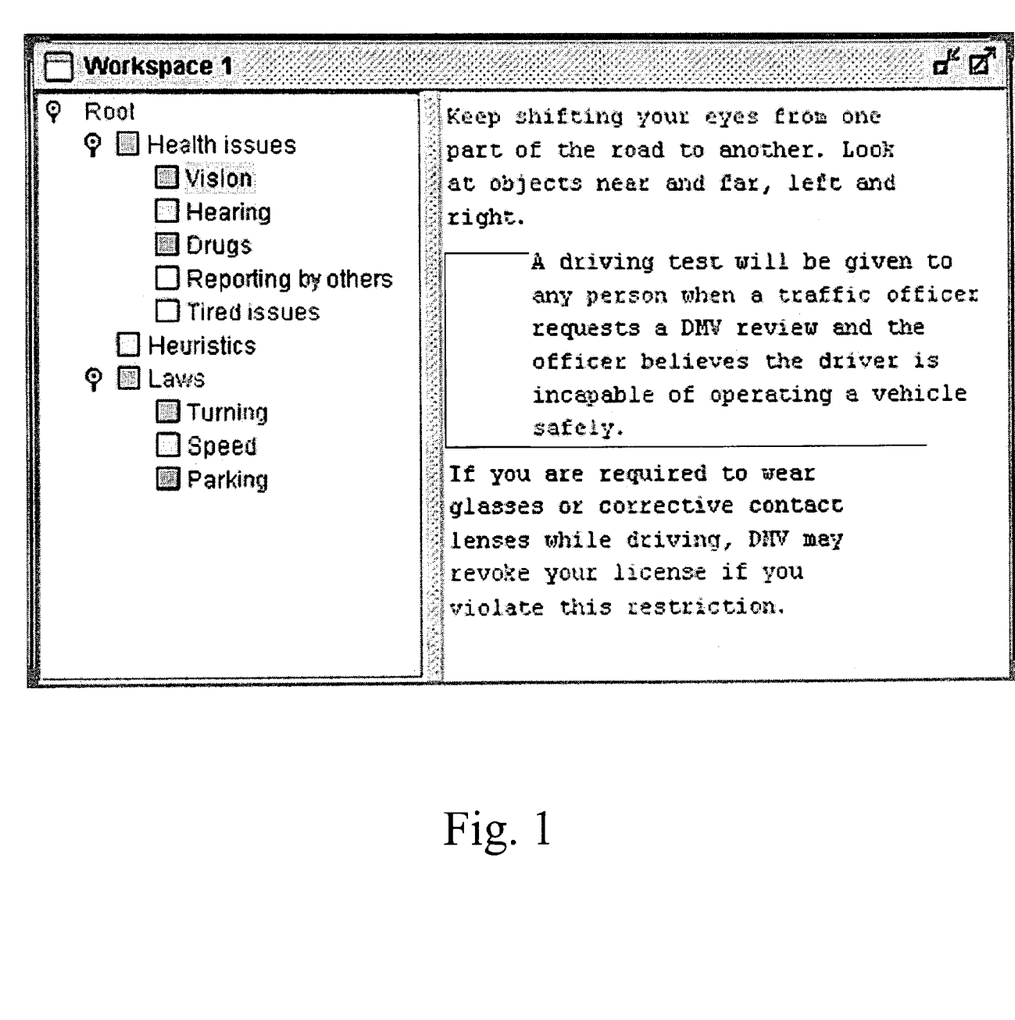
FIG. 1 is an exemplary structural overview.

Structural overviews are well suited for rule-based classification where the formal categories correspond to labels in an outline. FIG. 1 is an example of structural overviews. An interface, such as a drag-and-drop interface, makes the process of adding objects to a category convenient. Structural overviews can incorporate nesting, yielding hierarchical trees of categories.

However, structural overviews provide no support for exemplar-based classification because the structural overviews show the labels of formal categories, but nothing about the informal categories.

Spatial overviews provide a rendering of the workspace. Such overviews can be allocated permanently or transiently at a portion of the display space, while most of the sensemaker's work is done in a focus of the workspace. Using such spatial overviews, formal categories and informal categories can be both shown at a reduced scale.

However, because of the reduced scale, the sensemaker may have to zoom in the workspace in order or put a desired section of the workspace in focus, to recognize and understand the contents of objects for classification.

Figure 2:
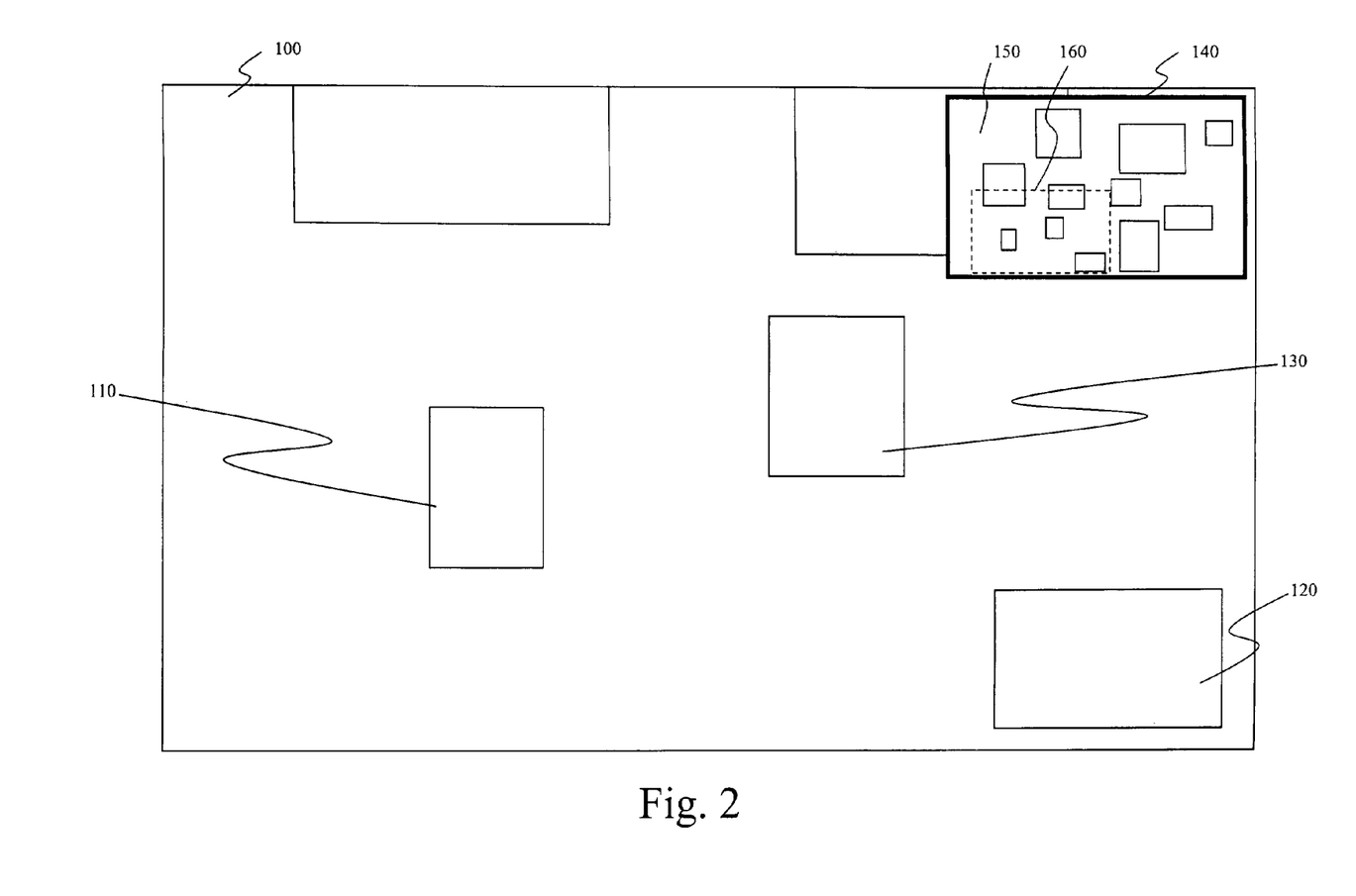
FIG. 2 is an exemplary workspace including a current view of objects and an overview.

FIG. 2 shows an example of a workspace, a viewed space, an overview and objects. In FIG. 2, a focus 100 includes objects 110-130. An overview 140 provides a rendering of an entire workspace 150. A frame 160 indicates a currently viewed space within the workspace 150. An object may have one or more sub-objects within, which may form a multi-level object. A sensemaker can bring any part of the workspace into the viewed space by clicking or dragging on a region in the overview 140 or scrolling the viewed space.

U.S. Pat. No. 6,243,093 to Czerwinski et al. discloses a system for spatially organizing stored web pages that automatically highlights similar web pages during organization and retrieval tasks. When the user drags or clicks on a web page, similarity metrics between the dragged or clicked web page and other stored web pages in a single-level spatial workspace are computed and web pages with such similarity are highlighted to the sensemaker. This system computes similarity metrics between items in a spatial workspace and displays this similarity to the user. However, this system does not indicate how objects are similar, but rather simply indicates numeric scores for the similarity. Similarly, this system does not use automatic similarity indicators for labeled hierarchical organizations rather than large single level spaces.

Similar techniques have also been applied to information retrieval in large document collections, such as the Web. One such technique described by Hearst (Hearst, 1995, TileBars: Visualization of Term Distribution Information in Full Text Information Access, Proceedings of CHI '95. p. 59-66), called TileBars, creates simple colored rectangles to represent the pages in a set of documents. In this technique, the intensity of the fill color of these rectangles signifies the number of query matches on the specified page. A related technique by Woodruff et al. (Woodruff, Faulring, Rosenholtz, Morrison, & Pirolli, 2001, Using Thumbnails to Search the Web, Conference Proceedings of CHI 2001, Vol. 3, Issue 1, p. 198-205, 552) enhances standard web page thumbnails with enlarged text labels. These enlarged labels indicate the location and frequency of query terms, combining the benefits of traditional thumbnails with the benefits of simple text summaries. Nevertheless, both these techniques have been applied only to static one-dimensional documents. These techniques do not extend them to dynamic documents with multiple dimensions.

SUMMARY OF THE INVENTION

The interactive classification technique according to the invention facilitates classification of a new object added to a workspace. In a workspace for sensemaking, objects often include text segments. In addition, objects may be made multi-level, that is, objects may have sub-objects within. Sensemakers tend to use a mixture of rule-based and exemplar-based strategies for classification tasks when working in such a workspace. A mixture of strategies enables sensemakers to create tentative clusters when the sensemakers are not yet sure of the criteria, and to create efficient rule-based categories, as the criteria are determined or established.

To increase the efficiency and ease of locating and understanding objects in a workspace, objects may be interactively classified and put together based on the objects' similarity.

Therefore, an object of the invention is to provide methods and systems for interactive classification of objects. In various exemplary embodiments, the method includes receiving an instruction to place a new object into a workspace, determining a similarity of the new object to an existing object, category, or cluster, and providing a visual indication of the similar words in both the new object and an existing object, cluster, or category. The visual indication may also reflect the degree to which the new object is similar to the existing object, cluster, or category. The method may also provide an indication of a place for manual placement of the new object. The method may also include providing a view of a place with objects having the similarity.

Therefore, the methods and systems according to this invention can facilitate classification of objects in a workspace and thus facilitate the sensemaker's understanding of the objects and the workspace.

BRIEF DESCRIPTION OF THE DRAWINGS

Various exemplary embodiments of the systems and methods according to this invention will be described in detail, with reference to the following figures, wherein.

DETAILED DESCRIPTION OF EXEMPLARY EMBODIMENTS

Interactive classification methods according to this invention can provide a way to automatically classify and/or place a new object, or provide assistance for manual classification and/or placement of objects in a workspace, based on similarity of the objects. In various exemplary embodiments, the methods according to this invention facilitate interactive classification with improved performance, such as speed and/or ease.

Various aspects of this present invention may be incorporated in a system, such as the systems disclosed in a co-pending, co-assigned U.S. patent application Ser. No. 10/371,017 entitled "System and Method for Interaction of Graphical Objects on A Computer Controlled System," which is incorporated herein by reference in its entirety.

For interactive classification of an object, a similarity metric may be determined for identifying which objects are more similar, and a key element identifier may be used for determining which of various elements, such as words, in an object contributes most to the judgment of similarity. For example, similarity may be determined as follows.

First, an object may be divided into elements, such as, individual words. Then, the words are reduced to the smallest form, or stems, so that variant forms of each individual word become identical. Stem or term frequencies in the object ("document") and in the collection of objects ("corpus") are then computed. A combined weight reflecting the relative frequencies of the terms in the document and corpus is computed using a term frequency inverse document frequency (TFIDF) or similar scheme.

Figure 3:
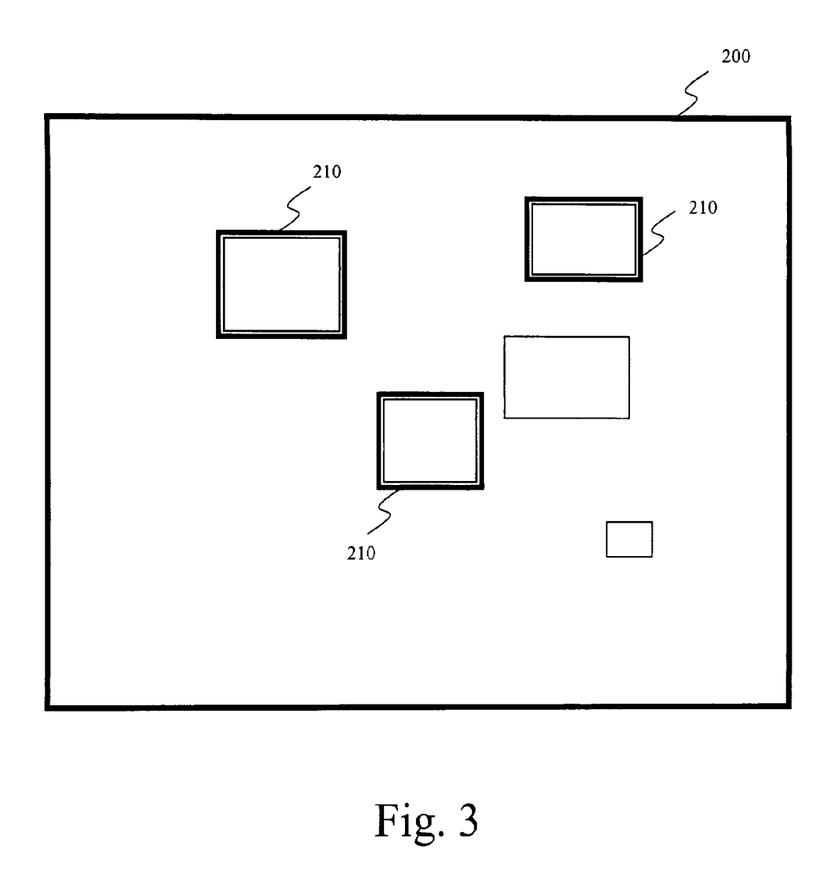
FIG. 3 shows a first exemplary embodiment according to this invention in which objects in a workspace are highlighted based on a similarity metric.

A similarity matcher may be used in conjunction with other parts of a sensemaking tool to give a sensemaker more useful feedback and to facilitate an interactive classification task. For example, related objects and groups in the workspace and overview may be highlighted when a new object is selected for classification. For example, as shown in FIG. 3, in an overview 200, objects 210 that have a similarity with the new object are highlighted for an indication to the sensemaker. Such highlighting may draw the sensemaker's attention to the most likely classification opportunities, depending on the selectivity of the similarity computation. Alternatively or additionally, the system may automatically pan into a view that includes a best-matching object, cluster, or category for the new object. Further, a shortcut operation, such as a gesture or button on the object, may be provided that instructs the system to classify the object, without the sensemaker needing to perform a drag-and-drop operation. In many cases, combining such feedback with what the sensemaker already knows about the collection may be enough to facilitate complete classification.

In addition to determining a similarity metric for individual objects, a similarity score for a group, such as a cluster or explicit category, may be determined.

One approach is to take all of the objects in a group and treat the objects as if the objects constitute a single document. Assuming that the term frequencies are normalized for the document, this approach may essentially create an average document to which the unclassified object may be compared.

Another approach is to take a score of the best matching object in a group as a representative of the group. This approach may tend to emphasize clusters where at least some of the objects have a very high similarity to the unclassified object.

Another approach is to determine a weighted intermediate score between the average match and the best match for a group. For example, a composite score may be determined from the average similarity and the best similarity for the group.

The methods for computing a similarity score for a group as described above may not take into account any explicit rules for formal categories. In classification tasks, the "rules" may be in the form of labels rather than executable rules. Various methods are contemplated for including the content of the label of a group in a similarity matching process, as further described below.

One approach is to simply match the label, ignoring the content of the objects in the group. Another approach is to append one or more copies of the group label to the individual objects in order to enhance the contribution of the label terms in the computation of a similarity score for each object. This approach can be combined with the methods described above.

In the case of informal categories, two exemplary approaches are computing similarities only for individual objects and computing aggregate similarities. The latter approach may require determining which objects are in a cluster. Two kinds of information may be used to in determining cluster membership: the coordinates of the objects in the workspace and the similarity of the objects. Such information may be combined in various ways. Once a cluster is identified, the aggregate scoring methods described above for groups may be used.

One approach to displaying similarity information, either in an overview or in a detailed workspace, is to use a similarity metric to determine which regions to highlight. This approach may be similar to a technique disclosed in a copending, co-assigned U.S. patent application Ser. No. 10/369,617 entitled "Methods and System for Indicating Invisible Contents of Workspace", incorporated herein by reference in its entirety. Various visual effects may be used to convey information, such as color and intensity.

For example, only matches above a predetermined threshold may be included in the visual transfer functions using, for example, one form of highlighting to indicate matches for which there is a very high degree of similarity and another form of highlighting to indicate matches with a significant, but more moderate degree of similarity.

An issue with just using similarity scores for classification is that the scores may be non-specific. An object about, for example, "driving tips" might match one group of objects on the basis of one criterion (e.g., "weather rules" or rules mentioning "fog") and another group of objects on the basis of another criterion (e.g., "speed rules" or rules mentioning "speed"). If the similarity scores for the two groups are about equal, then highlighting by itself does not convey information for discriminating between the two groups.

An alternative to simple highlighting based on the similarity score is to augment the display of matching objects with a specific indicator of the reason for the match, such as the particular elements that contribute most to the similarity score. In the above-described examples, the indicator may be, for example, temporarily superimposing the most important matching or similarity term(s) in a different color on each object or group.

Figure 4:
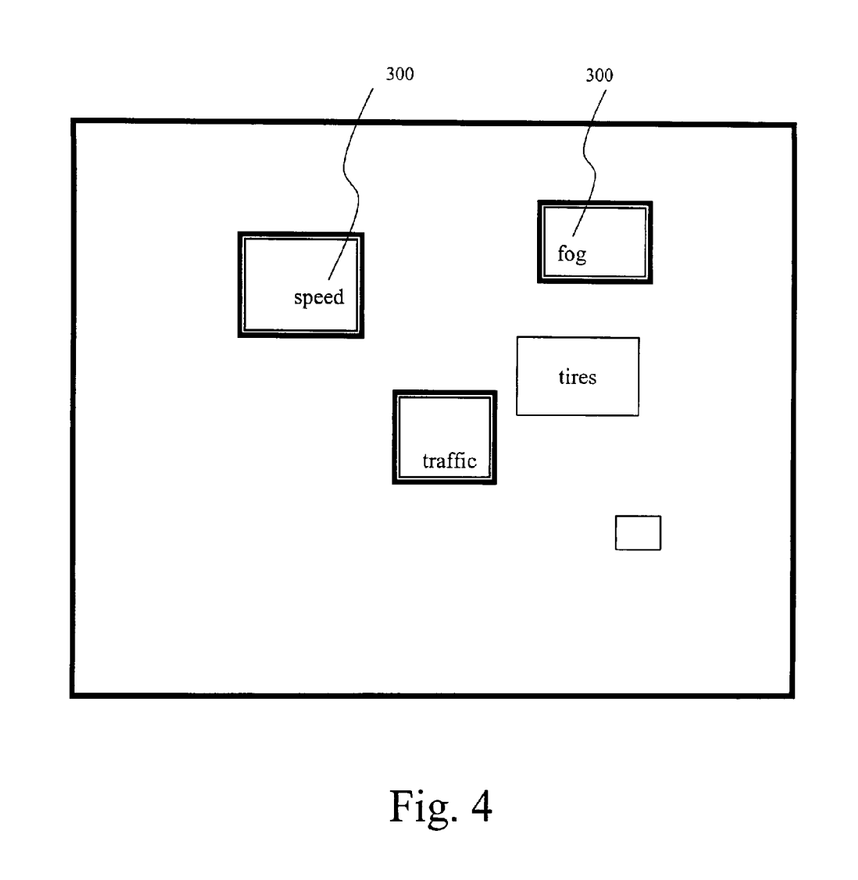
FIG. 4 shows a second exemplary embodiment according to this invention in which terms are enlarged.

This approach of enhancing the display of similar objects and groups compensates to some degree for the inevitable irregularities in similarity matching scores and provides more specific signals to the sensemaker about which groups or objects are similar in ways that matter. As shown in FIG. 4, where more than one category is similar, specific terms 300 like "fog" and "speed" may be enlarged to convey more information to the sensemaker. Other indication of terms is contemplated as well, such as highlighting, flashing, and the like.

When similarity signals are displayed, the indication should be clear as to which objects the similarity signals refer. One approach is to display similarity signals, such as similarity terms, within the bounds of the matched object. Another approach is to provide call-outs or labels on arrows that indicate that a similarity signal refers to a particular object.

As new objects are classified, the similarity signals may need to be refreshed to make use of the information in the objects. That is, signals from a previous match may need to disappear. One approach is to make similarity signals transient so that the signals may stay in view only during a specific matching operation. Another approach is to make the signals slowly fade from the display, or to make the signals disappear in response to a sensemaker's request. It will be appreciated that many other approaches are possible.

The strongest matches may not be close enough to be displayed simultaneously. The system may automatically bring into view the objects or groups with the greatest degree of match. Furthermore, the system may automatically pan, scroll, or zoom based on the similarity scores of the groups and/or objects.

Should the sensemaker desire to return to the workspace in which the sensemaker was working before such panning, scrolling or zooming, controls enabling the sensemaker to go forward or backward, for example, by forward and backward buttons, may be provided to help the sensemaker tour the matching groups and/or objects. An example of a technique used to go forward or backward is described in a co-pending, co-assigned U.S. patent application Ser. No. 10/369,612 entitled "Method and System for Navigating A Workspace," which is incorporated herein by reference in its entirety.

Another approach is to use "pop-up signals" such that the similarity signal appears on the objects when an input is received. For example, as the sensemaker moves a cursor, a mouse pointer or the like over an overview or over the workspace, annotations about similarity may transiently appear.

Moreover, when a new object to be classified has a degree of match with nested groups at several levels of a hierarchy, the signal may need to differentiate among the levels and may indicate the level where the similarity is the greatest.

Similarity may be shown either to individual objects of a group or to a group as a whole. Generally, there may not be enough space to display both. The amount of space available can be used to govern the choice. When there is insufficient space to indicate the similarity to each of the separate objects in a group, the display may be limited to the similarity terms for the group as a whole. In the case of clusters, a determination of the elements that are in the cluster may be required.

Drag-and-drop interfaces to an overview may speed up the classification of a new object. Using the drag-and-drop interfaces, when the user places a new object, the system may automatically indicate one or more positions to which the user may place the new object based on the similarity between the new object and the objects that already exist in the workspace. The description of how the drag-and-drop technique works is omitted here since any existing or hereafter developed drag-and-drop technique may be used. It should be understood that any other known or hereafter developed technique for introducing an object to the workspace may be used.

Figure 5:
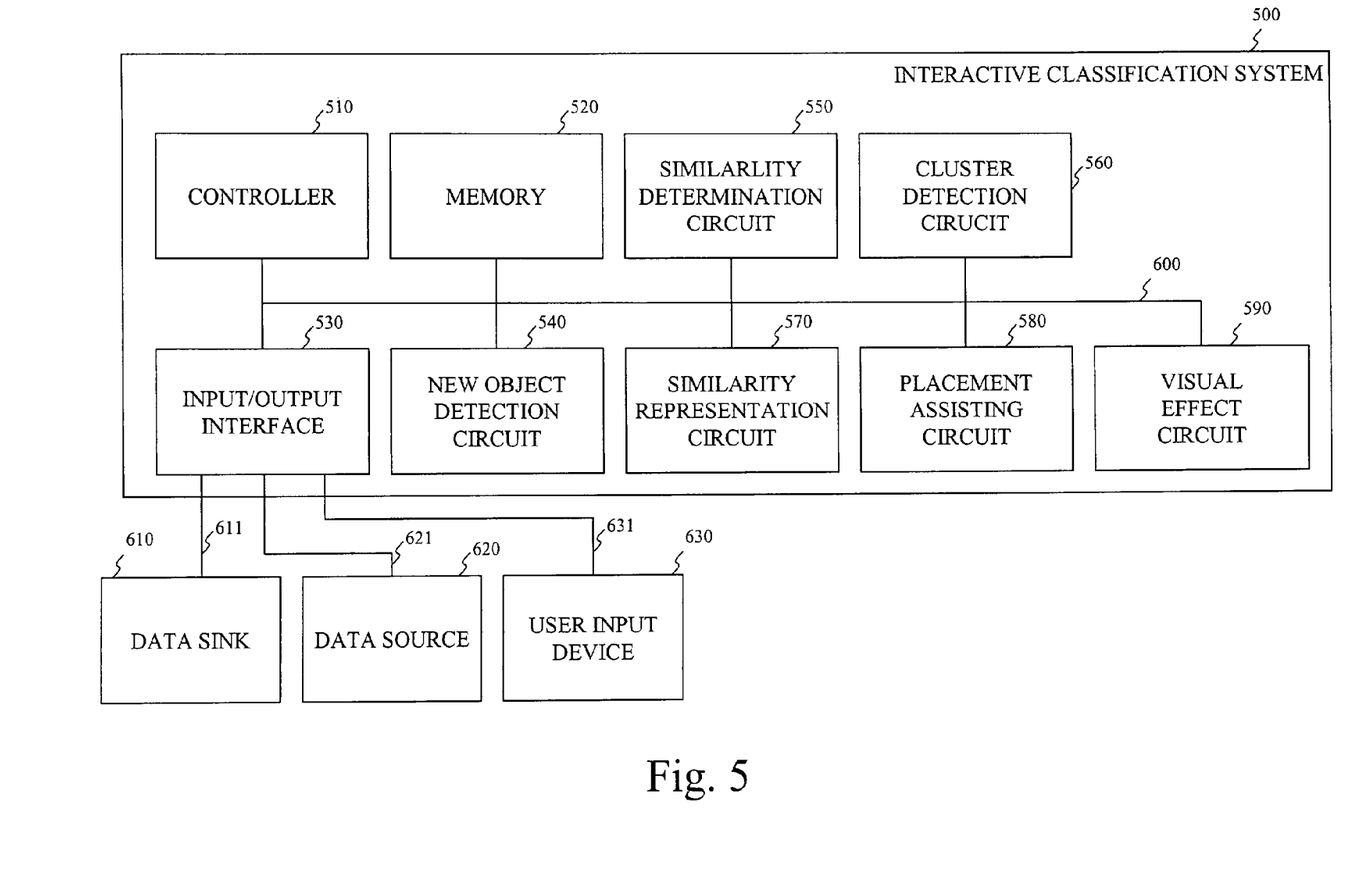
FIG. 5 is an exemplary block diagram of an interactive classification system according to this invention.

FIG. 5 shows a block diagram of an interactive classification system 500 according to the invention. The interactive classification system 500 includes a controller 510, a memory 520, an input/output (I/O) interface 530, a new object detection circuit 540, a similarity signal determination circuit 550, a cluster detecting circuit 560, a representation circuit 570, a placement assisting circuit 580, and a visual effect circuit 590, which are connected to each other via a communication link 600. To the I/O interface 530, a data sink 610, a data source 620 and a user input device 630 are connected via communication links 611, 621 and 631, respectively.

The controller 510 controls the general data flow between other components of the interactive classification system 500. The memory 520 may serve as a buffer for information coming into or going out of the system 500, may store any necessary programs and/or data for implementing the functions of the interactive classification system 500, and/or may store data, such as history data of interactions, at various stages of processing.

Alterable portions of the memory 520 may be, in various exemplary embodiments, implemented using static or dynamic RAM. However, the memory 520 can also be implemented using a floppy disk and disk drive, a writable or rewritable optical disk and disk drive, a hard drive, flash memory or the like.

The I/O interface 530 provides a connection between the interactive classification system 500 and the data sink 610, the data source 620, and the user input device 630, via the communication links 611, 621, and 631, respectively.

The new object detection circuit 540 receives an instruction from the user to place a new object. To provide the instruction, the user may use a drag-and-drop technique, for example, to place a new object.

The similarity determination circuit 550 determines the similarity of a new object to the objects in the workspace. Such determination may be done by, for example, determining a similarity metric for identifying which object(s) is most similar and determining which of the elements (e.g., words) in the new object most contributed to the judgment of similarity. Such similarity metric may be calculated by breaking an object into elements, such as words, reducing the elements to stems, and computing term (stem) frequencies in the object and in the collection of objects.

The cluster detecting circuit 560 determines a cluster or a group of objects in the workspace. Determination of a cluster or a group may be done by identifying coordinates of the objects in the workspace and/or the similarity of the cluster or the group.

The similarity representation circuit 570 represents the indication of similarity of the new object to the existing objects by, for example, highlighting the most similar categories or objects. In addition, the similarity representation circuit 570 may transiently pop up a similarity signal based on an input from a user interface, such as moving a cursor onto an interface using a mouse or the like. The representation circuit 570 may also represent elements in objects that are most similar to the new object and refresh the similarity signal for previous matches by using, for example, fading operations.

The placement assisting circuit 580 provides assistance to the sensemaker for placement of the new object, including, for example, highlighting a possible space for placement of the object based on the similarity metric or providing an arrow in the overview.

The visual effect circuit 590 provides visual effects after placement of the new object. Such visual effects may include scrolling, panning, and/or zooming in the workspace.

The data sink 610 can be any known or later-developed device that is capable of outputting or storing the processed media data generated using the systems and methods according to the invention, such as a display device, a printer, a copier or other image forming device, a facsimile device, a memory or the like. In the exemplary embodiments, the data sink 610 is assumed to be a display device, such as a computer monitor or the like, and is connected to the interactive classification system 500 over the communications link 611.

The data source 620 can be a locally or remotely located computer sharing data, a scanner, or any other known or later-developed device that is capable of generating electronic media, such as a document. The data source 620 may also be a data carrier, such as a magnetic storage disc, CD-ROM or the like. Similarly, the data source 620 can be any suitable device that stores and/or transmits electronic media data, such as a client or a server of a network, or the Internet, and especially the World Wide Web, and news groups. The data source 620 may also be any known or later developed device that broadcasts media data.

The electronic media data of the data source 620 may be text, a scanned image of a physical document, media data created electronically using any software, such as word processing software, or media data created using any known or later developed programming language and/or computer software program, the contents of an application window on a sensemaker's desktop, e.g., the toolbars, windows decorations, a spreadsheet shown in a spreadsheet program, or any other known or later-developed data source.

The user input device 630 may be any known or later-developed device that is capable of imputing data and/or control commands to the interactive classification system 500 via the communication link 631. The user input device may include one or more of a keyboard, a mouse, a touch pen, a touch pad, a pointing device, or the like.

The communication links 600, 611, 621 and 631 can each be any known or later-developed device or system for connecting between the controller 510, the memory 520, the I/O interface 530, the new object detection circuit 540, the similarity determination circuit 550, the cluster detecting circuit 560, and the representation circuit 570, the placement assisting circuit 580, and the visual effect circuit 590, to the data sink 610, the data source 620, and the user input device 630, respectively, to the interactive classification system 500, including a direct cable connection, a connection over a wide area network or local area network, a connection over an intranet, a connection over the Internet, or a connection over any other distributed processing network system. Further, it should be appreciated that the communication links 600, 611, 621 and 631 can be, a wired wireless or optical connection to a network. The network can be a local area network, a wide area network, an intranet, the Internet, or any other known or later-developed other distributed processing and storage network.

Figure 6:
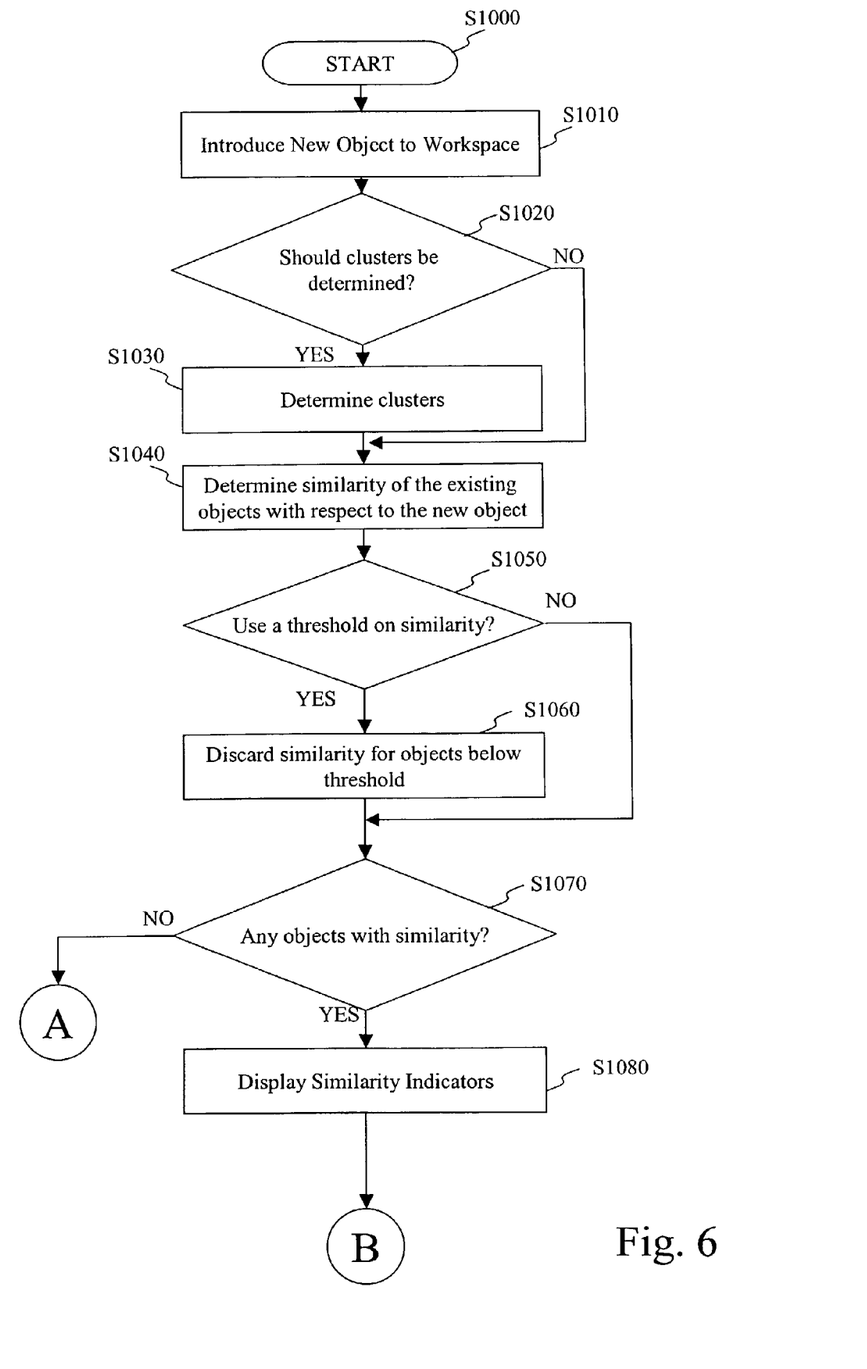
FIGS. 6 and 7 show a flowchart illustrating an exemplary embodiment of a method of interactive classification according to this invention.
Figure 7:
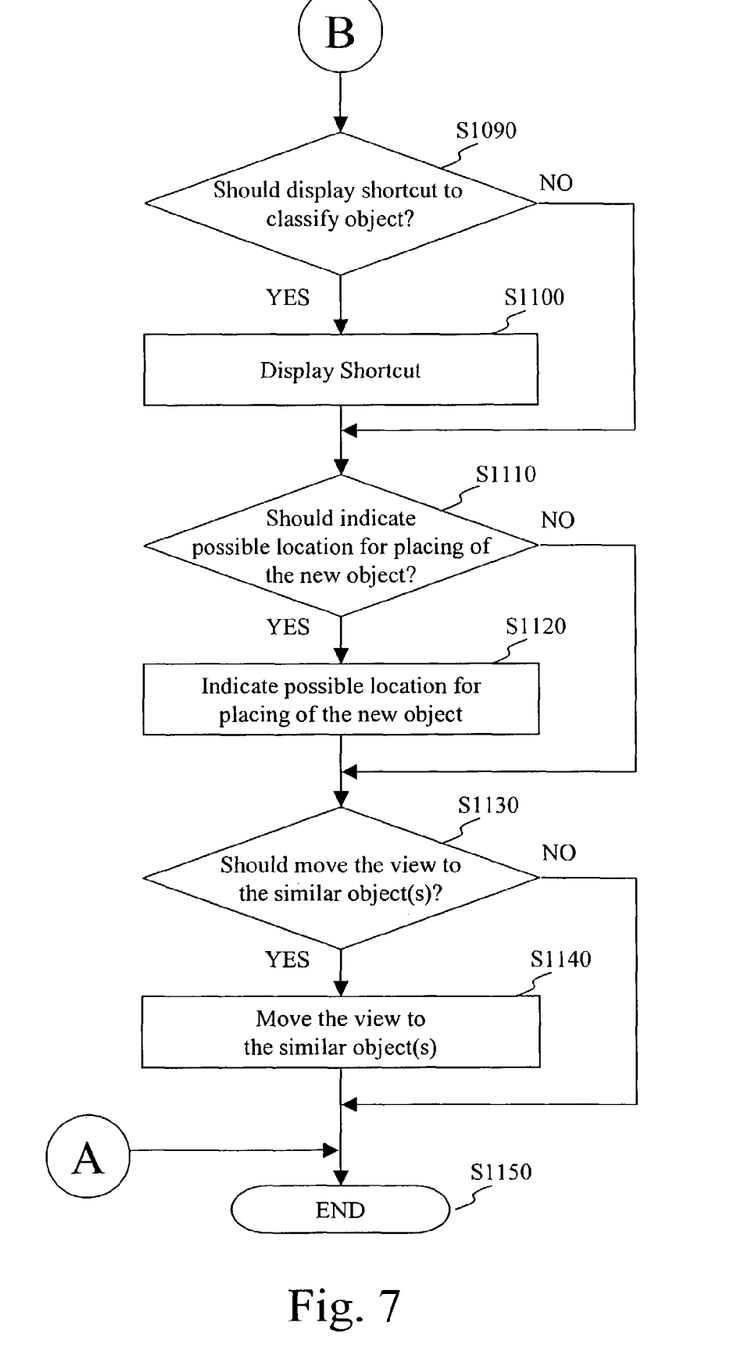

FIGS. 6 and 7 show a flowchart of an exemplary embodiment of a method of indicating objects according to the invention.

The process starts at step S1000 and continues to step S1010. In step S1010, a new object is introduced to an overview of a workspace, and the process continues to step S1020. In step S1020, a determination is made as to whether clusters should be determined. If so, the process continues to step S1030; otherwise the process jumps to step S1040.

In step S1030, clusters are determined, and the process continues to step S1040. In step S1040, similarity of the objects already existing in the work space is determined with respect to the new object. Then, the process continues to step S1050.

In step S1050, a determination is made as to whether a threshold on the similarity should be used. If so, the process continues to step S1060; otherwise, the process jumps to step S1070. In step S1060, the objects having similarity below the threshold are discarded, and the process continues to step S1070.

In step S1070, a determination is made as to whether there are any objects with the similarity. If so, the process continues to step S1080; otherwise, the process jumps to step S1150, at which the process ends.

In step S1080, similarity indicators are displayed. The similarity indicators may include similarity metrics and highlighting terms used for determining the similarity, for example. In step S1090, a determination is made as to whether a shortcut should be displayed to assist classification of objects. If so, the process continues to step S1100; otherwise, the process jumps to step S1110.

In step S1100, the shortcut is displayed, and the process continues to step S1110. In step S1110, a determination is made as to whether a possible location(s) for placing of the new object should be indicated. If so, the process continues to step S1120; otherwise, the process jumps to step S1130.

In step S1120, a possible location(s) for placing of the new object is indicated, and the process continues to step S1130. In step S1130, a determination is made as to whether a viewed space should be moved to the similar object(s). If so, the process continues to step S1140; otherwise the process jumps to step S1150. At step S1140, a viewed space is moved to the similar object(s). Then, the process continues to step S1150. The process ends at step S1150.

It is apparent that these steps are described in above order for illustration purpose, and in various exemplary embodiments, the determination of similarity of objects, placement of the new object and the like described above, may be performed in different order and/or with additional or fewer steps. Furthermore, the invention is not limited to the above described methods and system. Those skilled in the art would understand that many different modifications are possible without departing from the scope of the invention.

Additionally, those skilled in the art will recognize many applications for the present invention include, but not limited to, document display devices, such as browser devices, that display applications of a personal computer, handheld devices, and the like. In short, the invention has application to any known or later-developed systems and devices capable of interactively classifying objects in a workspace.

In the exemplary embodiments outlined above, the interactive classification system 500 can be implemented using a programmed general-purpose computer. However, the interactive classification system 500 can also be implemented using a special purpose computer, a programmed microprocessor or microcontroller and peripheral integrated circuit elements, an ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flowchart shown in FIGS. 8-10 can be used to implement the interactive classification system 500.

Each of the circuits or routines and elements of the various exemplary embodiments of the interactive classification system 500 outlined above can be implemented as portions of a suitable programmed general purpose computer. Alternatively, each of the circuits and elements of the various exemplary embodiments of the interactive classification system 500 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the interactive classification system 500 outlined above will take is a design choice and will be obvious and predicable to those skilled in the art.

Moreover, the exemplary embodiments of the interactive classification system 500 outlined above and/or each of the various circuits and elements discussed above can each be implemented as software routines, managers or objects executing on a programmed general purpose computer, a special purpose computer, a microprocessor or the like. In this case, the various exemplary embodiments of the interactive classification system 500 and/or each or the various circuits and elements discussed above can each be implemented as one or more routines embedded in the communication network, as a resource residing on a server, or the like. The various exemplary embodiments of the interactive classification system 500 and the various circuits and elements discussed above can also be implemented by physically incorporating the interactive classification system 500 into a software and/or hardware system, such as the hardware and software system of a web server or a client device.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for interactive classification of objects, comprising:
    receiving an instruction to place a new object in a workspace containing organized existing objects;
    determining a degree of similarity of the new object to existing clusters of one or more existing objects or categorized groups of existing objects in the workspace using a similarity metric;
    providing a visual indication of basis of similarity of a new object to the clusters or groups by visually indicating in similar clusters or groups one or more specific similarity terms or similarity elements that are the basis of similarity, and
    wherein the degree of similarity is used to influence space allocation and altering of a display of the workspace by one or more of panning, scrolling or resizing of objects to automatically bring into view clusters or group of the most similar objects without modifying the organization of the existing objects in the workplace.

2. The method of claim 1, further comprising:
    determining a threshold degree of similarity;
    wherein providing the visual indication is only for existing clusters or categories groups having a degree of similarity above the threshold.

3. The method of claim 1, further comprising transiently displaying the similarity metric.

4. The method of claim 1, wherein determining the similarity comprises computing a weight using a term frequency times inverse document frequency computation.

5. The method of claim 1, further comprising providing an indication of a possible place for placement of the new object.

6. The method of claim 1, further comprising providing a user with a shortcut operation for classifying the new object.

7. The method of claim 1, further comprising providing a spatial or hierarchical overview of the a workspace that includes the similarity metric.

8. The method of claim 7, wherein providing the overview includes at least one of scrolling, panning, and zooming.

9. The method of claim 1, wherein the visual indication is one or more of making the similarity terms bold or highlighted or superimposed over a display of the similar clusters or groups using a different color font.

10. The method of claim 1, wherein a display of clusters and groups includes hierarchies of groups.

11. The method of claim 10, wherein the degree of similarity determination applies to groups at all levels of the hierarchy.

12. The method of claim 11, wherein the visual indication applies to clusters or groups at all levels of hierarchy.

13. An interactive classification system, comprising:
    a processor configured to execute the following circuits:
        a new object detection circuit that receives an instruction to place a new object in a workspace containing organized existing objects;
        a similarity determination circuit that determines a degree of similarity of the new object to existing clusters of one or more existing objects or categorized groups of existing objects in the workspace using a similarity metric;
        a similarity representation circuit that provides a visual indication of a basis of similarity of the new objects to the clusters or group by visually indicating in similar clusters or groups one or more specific similarity terms or similarity elements that are the basis of similarity; and
        a visual effect circuit used to influence space allocation and altering of a display of the workspace based on the degree of similarity by one or more of panning, scrolling or resizing of objects to automatically bring into view on the display clusters or group of the most similar objects without modifying the organization of the existing objects in the workspace.

14. The system of claim 13, wherein the similarity determination circuit determines threshold degree of similarity, and wherein the visual indication is provided only for existing clusters or groups having the degree of similarity above the threshold.

15. The system of claim 13, wherein the similarity representation circuit transiently displays the similarity metric.

16. The system of claim 13, wherein the similarity determination circuit determines the similarity by computing a weight using a term frequency times inverse document frequency computation.

17. The system of claim 13, further comprising a placement assisting circuit that provides an indication of a possible place for placement of the new object.

18. The system of claim 13, further comprising a placement assisting circuit that provides a user with a shortcut operation that instructs to classify the new object.

19. The system of claim 13, wherein a visual effect circuit provides a spatial or hierarchical overview of a workspace that includes the similarity metric.

20. The system of claim 19, wherein the visual indication is one or more of making the similarity terms bold or highlighted or superimposed over a display of the similar clusters or groups using a different color font.

21. The system of claim 19, wherein a display of clusters and groups includes hierarchies of groups.

22. The system of claim 21, wherein the degree of similarity determination applies to groups at all levels of the hierarchy.

23. The system of claim 22, wherein the visual indication applies to clusters or groups at all levels of hierarchy.

* * * * *